(12) United States Patent
Metzler et al.

(10) Patent No.: US 7,254,993 B2
(45) Date of Patent: Aug. 14, 2007

(54) DEVICE FOR MEASURING TIME-RESOLVED VOLUMETRIC FLOW PROCESSES

(75) Inventors: Rainer Metzler, Kaarst (DE); Manfred Werner, Düsseldorf (DE); Heribert Kammerstetter, Oberalm (AT)

(73) Assignee: AVL Pierburg Instruments Flow Technology GmbH, Neuss (DE)

( * ) Notice: Subject to any disclaimer, the term of this patent is extended or adjusted under 35 U.S.C. 154(b) by 0 days.

(21) Appl. No.: 10/563,955

(22) PCT Filed: Jul. 6, 2004

(86) PCT No.: PCT/EP2004/007353

§ 371 (c)(1),
(2), (4) Date: Jan. 10, 2006

(87) PCT Pub. No.: WO2005/005935

PCT Pub. Date: Jan. 20, 2005

(65) Prior Publication Data

US 2006/0201244 A1    Sep. 14, 2006

(30) Foreign Application Priority Data

Jul. 10, 2003   (DE) ................... 103 31 228

(51) Int. Cl.
*G01M 15/00* (2006.01)
(52) U.S. Cl. .................................................. 73/119 A
(58) Field of Classification Search .............. 73/119 A, 73/112, 115, 116, 117.2, 117.3, 118.1
See application file for complete search history.

(56) References Cited

U.S. PATENT DOCUMENTS 3,895,529 A    7/1975   Moore
4,546,648 A    10/1985  Abt et al.

(Continued)

FOREIGN PATENT DOCUMENTS

DE    1 798 080    10/1973

(Continued)

OTHER PUBLICATIONS

International Search Report issued in corresponding application PCT/EP2004/007353 completed Nov. 16, 2004 and mailed Nov. 25, 2004.

(Continued)

*Primary Examiner*—Eric S. McCall
(74) *Attorney, Agent, or Firm*—Griffin & Szipl, P.C.

(57) ABSTRACT

The invention relates to a device for measuring time-resolved volumetric throughflow processes, especially injection process in internal combustion engines, having a translational volume difference sensor having a piston disposed in a measuring compartment and a detection device detecting the excursion of the piston, the detection device being linked with an evaluation unit. According to the invention, a pressure sensor is mounted in the measuring compartment in addition to the detection device which detects the excursion of the piston. The signal of the detection device corresponding to the excursion of the piston can be better evaluated as the compressivity of the fluid in the measuring compartment can be taken into consideration for the calculation of the amount to be injected. The inventive device allows for a highly time-resolved representation of throughflow processes so that both overall amount and exact course of the throughflow can be represented and evaluated.

16 Claims, 1 Drawing Sheet

U.S. PATENT DOCUMENTS

| | | | |
|---|---|---|---|
| 5,895,844 A * | 4/1999 | Krueger | 73/119 A |
| 6,915,683 B2 * | 7/2005 | Schoeffel et al. | 73/119 A |
| 7,000,450 B2 * | 2/2006 | Unger et al. | 73/1.36 |
| 2003/0140686 A1 * | 7/2003 | Bindel et al. | 73/119 A |
| 2003/0150259 A1 * | 8/2003 | Unger et al. | 73/119 A |

FOREIGN PATENT DOCUMENTS

| | | |
|---|---|---|
| DE | 31 39 831 A1 | 4/1983 |
| DE | 33 02 059 A1 | 4/1984 |
| DE | 39 16 419 A1 | 11/1990 |
| DE | 41 30 394 A1 | 3/1992 |
| DE | 44 34 597 A1 | 4/1996 |
| NL | 1015995 | 2/2002 |
| WO | WO 00/79125 A1 | 12/2000 |
| WO | WO 02/054038 A2 | 7/2002 |

OTHER PUBLICATIONS

International Preliminary Report on Patentability issued in corresponding International Application PCT/EP2004/007353 issued on May 29, 2006.

* cited by examiner

DEVICE FOR MEASURING TIME-RESOLVED VOLUMETRIC FLOW PROCESSES

This invention claims priority of PCT/EP2004/007353, filed on Jul. 6, 2004, which in turn claims priority on DE 10331228.5 filed on Jul. 10, 2003, the entire disclosures of which are incorporated herein by reference.

FIELD OF THE INVENTION

The invention relates to a device for measuring time-resolved volumetric flow processes, in particular of injection processes in internal combustion engines with a translatory volume difference sensor that is composed essentially of a piston arranged in a measuring chamber and a data acquisition device that senses the displacement of the piston, which data acquisition device is connected to an evaluation unit.

BACKGROUND OF THE INVENTION

Particularly in the area of direct-injection internal combustion engines that work by the diesel or four-stroke cycle method, the demands on injection systems with respect to the measured-out amount, the time, and the pattern of the injection are increasing continuously. Thus, injection patterns have been modified in recent years to the effect that either the injection amount to be measured out for a combustion cycle is divided into several small partial injections, or the rate pattern shaping is controlled by modulating the fuel pressure or by other rate-modulating measures. Appropriate measuring devices must be made available for this purpose.

Accordingly, a method is described in DE 31 39 831 A1 in which a measuring piston is moved by means of the fuel amount injected into a measuring chamber. The injection amount is decided from the path that the piston has traveled. After a certain number of individual injections, the measuring piston is conducted back into its starting position. The end positions of the measuring piston are recorded thereby in each case. However, due to the inertia of the piston mass and the occurring friction, measuring inaccuracies occur in this method that are too great for present-day conditions.

Thus, in DE 39 16 419 A1 an electromagnetically controlled measuring device is described that further develops the device according to DE 31 39 831 A1, whereby here the measuring chamber is emptied after each injection. While it is true that more accurate measuring results can be achieved by this due to the smaller total volumes to be measured, the problem of the relatively large piston mass to be moved still remains, so that vibrations and delays occur in the system as before. Thus, accurate measuring for example of a post-injection and its pattern analysis is not possible. Moreover the discharge of the respective measuring piston takes place with a discharge valve, so that injections following in very quick succession, as are usual in the normal operation of a combustion engine, cannot be resolved.

A further development of this device for improving the measuring accuracy is suggested in DE 44 34 597 A1. The return speed of the measuring piston is held constant, so that the switch delay of the magnetic valve can also be taken into consideration during emptying. In spite of this improved reproducibility of the starting position of the piston, the susceptibility of the system to vibration remains disadvantageous, not least due to the relatively large piston mass. Moreover, a resolution of closely-spaced individual injections and their patterns remains impossible due to the inertia of the total system.

In DE 41 30 394 A1, a measuring instrument for injection amounts is suggested, in which the injection takes place in a closed pressure container. After the incoming pressure in this pressure container has been measured after either the pre-injection or main injection, a valve is again switched so that the injected amount is drained into a measuring area in which a piston is again situated that is moved by the fluid, so that conclusions can be drawn about the injected volume from the movement of the piston. By means of such an embodiment it is indeed possible to resolve the injection processes with respect to the main or pre- or post-injection, but a quantitative statement about the injection patterns during for example a main injection remains impossible, since no continuous measurement of amounts is present. Moreover, such a design is not suitable for carrying out measurements on the engine while it is running, since several successive work cycles cannot be measured at that speed.

In WO 00/79125, the measuring principle is taken from DE 41 30 394 A1. However, the pressure in the pressure container is measured continuously, so that statements about the pattern of each individual injection are possible. The design is very complex, however, so that a large number of influencing variables reduce the measuring accuracy and reliability of the plant. Also, it is not possible to use such a device on an engine while it is running.

Alternatively, it is suggested in WO 02/054038 to make the movable piston lighter in order to avoid any post-vibration as much as possible, and to use a remote sensor to record the path to be measured, which sensor is capacitive or works on the eddy current principle. Through these measures the measuring accuracy is to be further increased.

In DE 1 798 080 an electronically controlled flow measuring and dosing instrument is again described that can measure flows with high accuracy over a large range. Due to its extremely low inertia, this measuring instrument is optimally suited for the immediate measurement of flows, but is not capable of reading synchronous-cycle flow rate information. This means that it is not possible to show the exact patterns of the injection processes to be measured and their periodicity simultaneously with the work cycle of a four-stroke or diesel engine.

With the exception of this device, it is common to all the known devices that only discontinuous flows can be measured downstream of the injection devices. This has the disadvantage that a flow rate measurement in combination with an optical analysis of the spread of an injection jet is not possible. Moreover, measuring accuracy is further limited.

A continuously working flow measuring instrument, which is installed downstream of the injection devices, is also disclosed by DE 33 02 059. The injection nozzle injects thereby into a conduit that leads to a gear pump and to which a second conduit is switched in parallel, in which second conduit slides a piston. These two conduits together form the necessary injection volume that can be changed by the movement of the piston. The path of the piston is measured and is also fed via an electrical closed-loop control circuit to a motor to control the speed of the gear pump. Due to the inertia of the piston and the fact that the physical properties of the injected fluid are not taken into consideration, the measurement of injected amounts with such a device gives insufficiently accurate measuring results.

SUMMARY OF THE INVENTION

Accordingly it is the object of the invention to create a device for measuring time-resolved volumetric flow processes that achieves results that can be evaluated quantitatively and qualitatively with a high measuring accuracy, whereby this device as far as possible should also be able to be positioned before an injection valve and be capable of measuring injection amounts and patterns continuously on a running engine. This makes it possible to judge the stability of the injections from cycle to cycle and from injection valve to injection valve quantitatively via statistical characteristic quantities. Accordingly, it must be possible to display measured values such as the injection rate or the partial amounts of multiple injections, as well as the total amount injected over a longer pattern.

This object is achieved in that a pressure sensor is arranged in the measuring chamber in addition to the data acquisition device sensing the displacement of the piston, which pressure sensor is connected to the evaluating unit such that by means of the measured values of the pressure sensor, a correction of the flow amount ascertained from the measured values of the data acquisition device takes place in the evaluating unit. By using the pressure sensor, measurement errors in the calculation of the injection amount are minimized by taking into consideration the compressibility of the fluid, so that the results of the measurements exhibit a clear qualitative and quantitative improvement.

In a preferred form of embodiment, a rotary displacer is assigned to the translatory volume difference sensor, which displacer is driven via a motor depending on the adjacent volume difference, whereby the measuring chamber is arranged in an intake duct that behind the translatory volume difference sensor in the flow direction opens into an outlet duct, and the rotary displacer is arranged in a bypass line to the translatory volume difference sensor, whereby the rotary displacer is controlled such that during one work cycle the speed of the displacer is constant and essentially corresponds to the average flow over the entire work cycle. Accordingly a sawtooth-shaped signal results as the piston path, since the movement of the piston is composed of a continuous movement due to the speed of the rotary displacer as well as of a discontinuous movement due to the individual injections. A work cycle corresponds thereby for example to a pre-injection, a main injection, and a post-injection.

Preferably, the data acquisition device is composed of a sensor whose produced voltage represents a measurement for the displacement of the piston and that continuously senses the displacement of the piston in the measuring chamber. Thus flow changes are recognized via a corresponding voltage change at the sensor, and through the transfer to the evaluating unit these results can be converted in a simple manner into an injection amount as well as an injection pattern. Through the continuous sensing of the displacement, such a device can also be used on a running engine with many successive injection processes, i.e. work cycles, since an emptying of the measuring chambers, for example by valves as in the state-of-the-art, is no longer necessary. Moreover, such a device can be installed both in front of and behind a fuel injection valve.

It is advantageous for the piston to have the same specific weight as the fluid to be measured. Because the specific weight of the piston corresponds to that of the fluid to be measured and the piston is arranged so that it can move freely, flow changes are recognized almost without delay through the corresponding voltage change at the sensor, so that it becomes possible to represent the time patterns of an individual injection.

In addition, a temperature sensor can be arranged in the measuring chamber, which sensor is connected to the evaluating unit, so that the temperature in the chamber can also be included in the calculation, as a result of which the accuracy of the measurement is further increased, since based on the pressure- and temperature signal, the piston path can be converted into an ideal piston path that would result during the measurement under isobaric and isothermal conditions. Accordingly the compressibility component of the fluid as a function of temperature and pressure is also taken into consideration.

The sensor of the translatory volume difference sensor can thereby be an optical sensor, an inductive sensor, or a sensor that works on the eddy current principle. These sensors work almost free of inertia, and thus yield very accurate measured values.

It has proved to be advantageous if the rotary displacer is embodied as a gear pump, since this conveys with extremely low pulsation.

For the simple evaluation of the total flow amount, it has proved to be advantageous if the motor is embodied as a servo motor and has a movement sensor connected to the evaluating unit and to an electronic control unit, whereby the signal of the movement sensor represents a measurement for the speed of the rotary displacer. The rotary displacer can be controlled in a simple manner via, for example, the signals of the optical sensor and the movement sensor.

The movement sensor is advantageously embodied as a pulse generator disk, which enables a reliable and very accurate ascertaining of the displacer speed.

Advantageously the hydraulic length from a fuel injection valve to the intake side of the rotary displacer is equal to the hydraulic length to the outlet side of the rotary displacer, which makes it possible to operate the displacer without an adjacent pressure difference and thus to be able at any point in time to determine exactly the amount injected up to that point.

When used to measure injection processes in combustion engines, a propagation of pressure waves through the entire measurement structure may result due to the compressibility of the fluid. To neutralize undesired reflections of these pressure waves, according to the invention the flow meter is arranged between at least one fuel injection valve and a delay time tube.

Thus a device is created that makes it possible to measure volumetric flow processes continuously and in a time-resolved manner, whereby the design is very simple and yet very high measuring accuracies are achievable. Qualitatively and quantitatively accurate statements about injection patterns and injection amounts, as well as their stability, can be activated hereby. Measured values such as the injection rate or the partial amounts of multiple injections, as well as the total amount injected in the same or a longer period of time, can be displayed with this device.

Moreover, the rotary displacer used for the continuous measurement can be calibrated in the conventional manner, so that by correlating the measured values, the single-shot measurements can be calibrated likewise in a comparably simple manner.

BRIEF DESCRIPTION OF THE DRAWINGS

A device according to the invention is shown in the figures and described below.

DETAILED DESCRIPTION OF THE PREFERRED EMBODIMENTS

Figure 1:
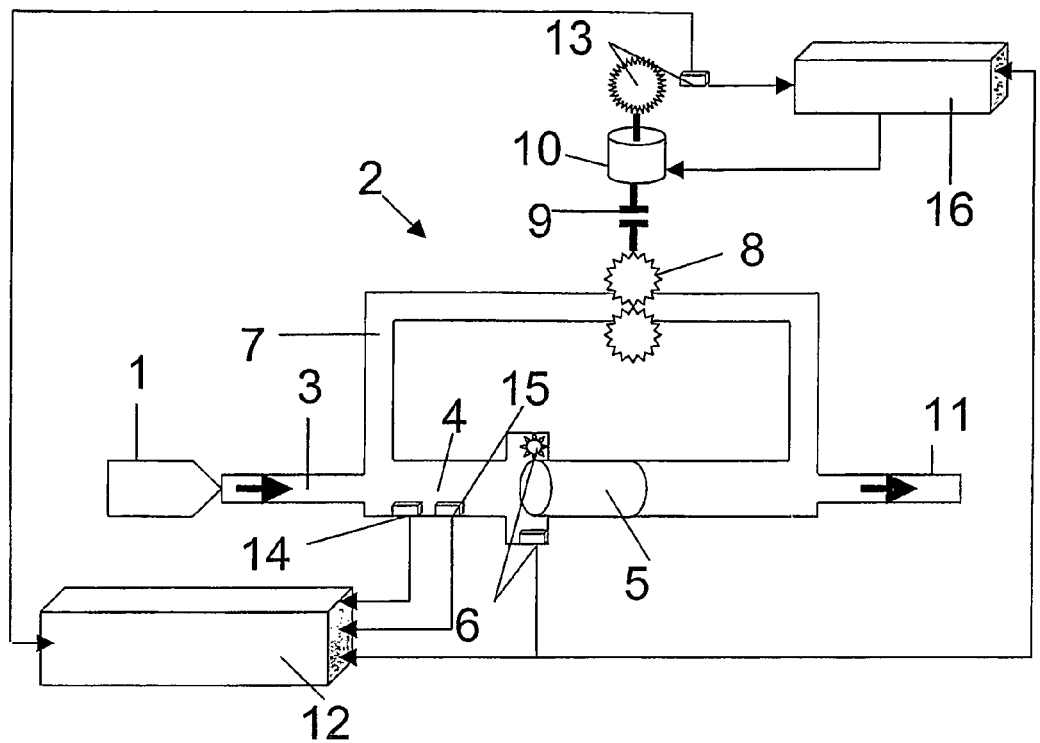
FIG. 1 shows schematically the design of the measuring device according to the invention behind an injection valve.

FIG. 1 shows a design for measuring injection processes in combustion engines with a device according to the invention for measuring time-resolved volumetric flow processes. It is composed of an apparatus, not shown, that produces a flow, in this case as a rule a high-pressure pump, and a fuel injection valve 1, via which fuel is injected into the measuring device 2. The measuring device 2 is composed of an intake duct 3 in which a measuring chamber 4 is arranged, in which again a piston 5 is arranged so that it is free to slide, whereby the piston 5 has the same specific weight as the fluid to be measured, i.e., the fuel. This piston 5 in the measuring chamber 4 serves as a translatory volume difference sensor. On the measuring chamber 4 a sensor 6 is arranged that is in interactive connection with the piston 5 and in which through the displacement of the piston 5 a voltage is produced that is dependent on the magnitude of the displacement of the piston 5.

In addition, a rotary displacer in the form of a gear pump 8 is arranged in a bypass line 7 that bypasses the translatory volume difference sensor, which line branches off as soon as possible behind the injection valve 1. The gear pump 8 is driven by a servo motor 10 via a coupling 9. Both the intake line 3 and the bypass line 7 open into an outlet duct 11.

The sensor 6 is connected to an evaluating unit 12 that senses and further processes the values of this sensor 6, as well as the number of revolutions of the motor 10, which is connected to a movement sensor in the form of a pulse generator 13. The sensor 6 is embodied here as an optical sensor. A pressure sensor 14 and a temperature sensor 15 are arranged in the measuring chamber 4 between the piston 5 and the injection device 1, which sensors continuously measure the pressures and temperatures occurring in this area and again feed them to the evaluating unit 12. To prevent reflections of pressure waves formed, a delay time tube, not shown, is arranged behind the outlet duct 11 of the measuring device 2, through which the pressure waves are uncoupled from the measuring process with respect to time.

The sequence of the measurements is described below. When fuel is injected from the fuel injection valve 1 into the measuring device 2 or the intake duct 3, the piston 5 immediately reacts identically to the fed column of fuel without delay, i.e. free of inertia, since it has the same specific weight as the fuel, so that its displacement represents a measurement of the volume of the injected amount of fuel. No pressure difference arises thereby in the measuring chamber 4, the intake duct 3, via the piston and via the gear pump 8, since the hydraulic length from the injection valve 1 to the intake and outlet side of the gear pump 8 are kept the same. The gear pump 8 arranged in the bypass duct 7 is simultaneously driven at a speed dependent on the displacement of the piston 5 and thus on the injected amount of fuel. However, the control takes place in such a way that the speed of the gear pump 8 is held constant over a work cycle, i.e., for example pre-injection, main injection, post-injection, and readjustment take place only if deviations occur, i.e., if a position of the piston 5 at the end of a cycle that does not correspond to the starting position before the work cycle. To this end the values of the sensor 6 at the beginning and end of a work cycle are compared in an electronic control unit 16 with the assistance of the values of the pulse generator disk 13, and a corresponding signal is produced for control of the motor 10.

Thus the displacement of the piston 5 is formed by superimposing a portion with constant speed in the opposite direction to the displacement direction during an injection, as well as of a discontinuous portion during an injection process. Thus for the movement of the piston 5, this results in a graph essentially showing a sawtooth profile, whereby the continuous portion of the piston movement is precalculated, through linear regression, via the rotation of the gear pump 8. The entire measuring device 2 must be arranged as close as possible to the injection valve 1 in order to keep the influence of the compressibility of the fluid as small as possible. With the aid of the pressure sensor 14 arranged in the measuring chamber 4 and the temperature sensor 15, the signal of the sensor 6, i.e., the signal arising from the movement of the piston 5, is converted in the evaluating unit 12 into a fuel injection amount over time. For this purpose the continuous portion of the movement arising through the gear pump 8 is automatically subtracted from the path actually traveled, i.e., from the values of the sensor 6. Accordingly the evaluating unit 12 receives from the pulse generator 13 on the servo motor 10 the corresponding signals for determining the flow through the gear pump 8. The conversion in the electronic evaluating unit 12 takes place via a physically based model calculation, in which the actually measured piston path is converted into an ideal piston path with the aid of the pressure and temperature signal, which ideal piston path would appear during measurement under isobaric and isothermal conditions. Accordingly the compressibility component of the fluid as a function of temperature and pressure is also taken into consideration in this calculation. Of course, this calculation is simplified very considerably by the constant speed of the gear pump 8 and thus the continuous movement portion of the piston 5.

Figure 2:
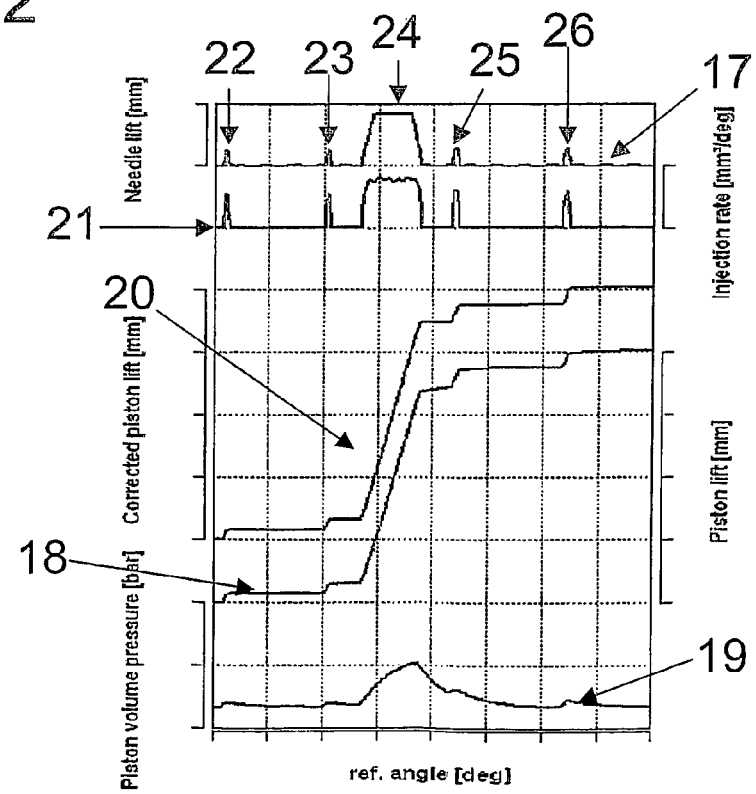
FIG. 2 shows by way of example typical piston patterns without a continuous portion through the gear pump during a work cycle with two pre-injections, one main injection, and two post-injections, as well as the resulting injection amount pattern.

FIG. 2 shows the needle lift 17 of the fuel injection valve 1 measured via inductive sensing, the piston path 18 measured by the sensor 6, whereby the continuous portion has already been calculated through the gear pump 8, the pressure pattern 19 measured by the pressure sensor 14, the piston path 20 corrected with the aid of the pressure pattern 19, and the resulting injection amount pattern 21 of the fuel injection valve 1 calculated from these data, over time. It is evident that the piston 5 is displaced in the measuring chamber 4 through the first pre-injection 22 and the pressure in the measuring chamber 4 rises. Through the displacement of the piston 5, the pressure in the measuring chamber 4 then falls again. The constant movement of the gear pump 8 causes the actually measured path from which the piston path 18 is derived, to show a steady drop. The actually measured path is not shown. Accordingly the pressure- and piston path patterns 18-21 result in the following second pre-injection 23 as well as the main injection 24 and the two post-injections 25, 26. The gear pump 8 is controlled so that the pressure and thus the actual position of the piston 5 again correspond to the starting position at the conclusion of the work cycle.

Through the direct movement of the piston 5 based on its almost nonexistent inertia, changes in the microsecond range can be measured and evaluated here during the work cycle, so that this measuring device 2 is capable of making comparisons between different injection valves 1 with respect to their injection amounts and in particular also with respect to the time patterns of the injection processes. The total flow over a certain time interval results from the output of the pulse generator 13 of the gear pump 8. The time interval is synchronized with the injections.

Alternatively, the above-described measuring device 2 can also be arranged before the fuel injection valve 1, whereby then the delay time tube is also arranged before the flow measuring, so that the entire measuring device 2 is arranged between the high-pressure pump and the fuel injection valve 1. In addition it is conceivable to provide appropriate safety functions for oversteering in the fully loaded range, in that for example a bypass duct is positioned on the outlet side of the measuring chamber such that fluid can overflow here if the displacement of the piston 5 is too great.

Furthermore it is evident that such a device is also suitable for measuring other flow processes.

This device according to the invention makes it possible to measure flow processes while the engine is running, in front of or behind the injection valve, with any desired number of successive fuel injection pulses. Thus it is possible to make quantitatively and qualitatively accurate statements about injection amounts and injection patterns, and to judge different injection valves.

It should be evident that in addition to inductive or optical sensors, other sensors such as speed sensors or acceleration sensors can also be used to measure the displacement of the piston, without leaving the scope of the main claim. In addition, the voltage produced by these sensors is a measurement for the displacement of the piston, whereby the speed or the acceleration of the piston is again converted into the path via single or double integration performed in the evaluating unit.

While the present invention has been described with reference to certain illustrative embodiments, one of ordinary skill in the art will recognize, that additions, deletions, substitutions and improvements can be made while remaining within the scope and spirit of the invention as defined by the appended claims.

What is claimed is:

1. Device for measuring time-resolved volumetric flow processes of injection processes in internal combustion engines, comprising:
    a translatory volume difference sensor having a piston arranged in a measuring chamber and a data acquisition device that senses a displacement of the piston;
    an evaluating unit connected to the data acquisition device; and
    a pressure sensor disposed in the measuring chamber and connected to the evaluating unit such that by means of measured values of the pressure sensor, a correction of a flow amount ascertained from the measured values of the data acquisition device takes place in the evaluating unit, wherein the displacement of the piston is formed by superimposing a portion with constant speed in an opposite direction to a displacement direction during an injection as well as a discontinuous portion during an injection process.

2. Device for measuring time-resolved volumetric flow processes of injection processes in internal combustion engines according to claim 1, wherein said data acquisition device comprises a sensor to produce a voltage representing a measurement for said displacement of said piston and that continuously senses said displacement of said piston in said measuring chamber.

3. Device for measuring time-resolved volumetric flow processes of injection processes in internal combustion engines according to claim 1, wherein said piston has a specific weight the same as that of a fluid to be measured.

4. Device for measuring time-resolved volumetric flow processes of injection processes in internal combustion engines according to claim 1, further comprising a temperature sensor disposed in said measuring chamber and connected to said evaluating unit.

5. Device for measuring time-resolved volumetric flow processes of injection processes in internal combustion engines according to claim 1, wherein said translatory volume difference sensor comprises a sensor selected from the group consisting of an optical sensor, an inductive sensor, and a sensor that works on an eddy current principle.

6. Device for measuring time-resolved volumetric flow processes of injection processes in internal combustion engines according to claim 1, wherein the device for measuring is connected between at least one fuel injection valve and a delay time tube.

7. Device for measuring time-resolved volumetric flow processes of injection processes in internal combustion engines, comprising:
    a translatory volume difference sensor having a piston arranged in a measuring chamber and a data acquisition device that senses a displacement of the piston;
    an evaluating unit connected to the data acquisition device; and
    a pressure sensor disposed in the measuring chamber and connected to the evaluating unit such that by means of measured values of the pressure sensor, a correction of a flow amount ascertained from the measured values of the data acquisition device takes place in the evaluating unit, wherein the translatory volume difference sensor further comprises a rotary displacer,
    the displacer is driven via a motor depending on an adjacent volume difference,
    the measuring chamber is disposed in an intake duct that opens into an outlet duct behind, in the flow direction, the translatory volume difference sensor, and
    the rotary displacer is arranged in a bypass line to the translatory volume difference sensor,
    whereby the rotary displacer is controlled such that during one work cycle the speed of the displacer is constant and essentially corresponds to the average flow over the entire work cycle.

8. Device for measuring time-resolved volumetric flow processes of injection processes in internal combustion engines according to claim 7, wherein said rotary displacer comprises a gear pump.

9. Device for measuring time-resolved volumetric flow processes of injection processes in internal combustion engines according to claim 7, wherein a hydraulic length from a fuel injection valve to an intake side of said rotary displacer is equal to a hydraulic length to an outlet side of the rotary displacer.

10. Device for measuring time-resolved volumetric flow processes of injection processes in internal combustion engines according to claim 7 wherein said data acquisition device comprises a sensor to produce a voltage representing a measurement for said displacement of said piston and that continuously senses said displacement of said piston in said measuring chamber.

11. Device for measuring time-resolved volumetric flow processes of injection processes in internal combustion engines according to claim 7, wherein said piston has a specific weight the same as that of a fluid to be measured.

12. Device for measuring time-resolved volumetric flow processes of injection processes in internal combustion engines according to claim 7, further comprising a temperature sensor disposed in said measuring chamber and connected to said evaluating unit.

13. Device for measuring time-resolved volumetric flow processes of injection processes in internal combustion engines according to claim 7, wherein said translatory volume difference sensor comprises a sensor selected from the group consisting of an optical sensor, an inductive sensor, and a sensor that works on an eddy current principle.

14. Device for measuring time-resolved volumetric flow processes of injection processes in internal combustion engines according to claim 7, wherein said motor comprises a servo motor having a movement sensor connected to said evaluating unit and to an electronic control unit, whereby a signal of the movement sensor represents a measurement for a speed of said rotary displacer.

15. Device for measuring time-resolved volumetric flow processes of injection processes in internal combustion engines according to claim 14, wherein said movement sensor comprises a pulse generator disk.

16. Device for measuring time-resolved volumetric flow processes of injection processes in internal combustion engines, comprising:

a translatory volume difference sensor having a piston arranged in a measuring chamber and a data acquisition device that senses a displacement of the piston;

an evaluating unit connected to the data acquisition device; and a pressure sensor disposed in the measuring chamber and connected to the evaluating unit such that by means of measured values of the pressure sensor, a correction of a flow amount ascertained from the measured values of the data acquisition device takes place in the evaluating unit, wherein the piston has a specific weight the same as that of a fluid to be measured.

* * * * *